(12) United States Patent
Benkreira et al.

(10) Patent No.: US 12,154,150 B2
(45) Date of Patent: Nov. 26, 2024

(54) SYSTEMS AND METHODS FOR RETRIEVING ONLINE MERCHANT TERMS OF A MERCHANT AND ASSOCIATING THE SAME WITH TRANSACTIONS

(71) Applicant: Capital One Services, LLC, McLean, VA (US)

(72) Inventors: Abdelkader Benkreira, Washington, DC (US); Joshua Edwards, Philadelphia, PA (US); Michael Mossoba, Arlington, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/993,622

(22) Filed: Nov. 23, 2022

(65) Prior Publication Data

US 2023/0089189 A1    Mar. 23, 2023

Related U.S. Application Data

(63) Continuation of application No. 16/935,675, filed on Jul. 22, 2020, now Pat. No. 11,538,079.

(51) Int. Cl.
G06Q 30/06    (2023.01)
G06F 16/951   (2019.01)
G06Q 30/0601  (2023.01)

(52) U.S. Cl.
CPC ....... *G06Q 30/0601* (2013.01); *G06F 16/951* (2019.01)

(58) Field of Classification Search
CPC .................................................. G06Q 30/0601
(Continued)

(56) References Cited

U.S. PATENT DOCUMENTS 6,219,653 B1    4/2001   O'Neill et al.
6,438,544 B1    8/2002   Grimmer et al.
(Continued)

FOREIGN PATENT DOCUMENTS

CA    3047637 A1 *  12/2019  ........... G06Q 20/065
EP    1595222 A2     11/2005
(Continued)

OTHER PUBLICATIONS

Elovici, Yuval; Shapira, Bracha; Meshiach, Adlay; Cluster-analysis attack against a PRivAte Web solution (PRAW); published in Online Information Review30.6: 624-643. Emerald Group Publishing Limited. (2006) retrieved from Dialog on Dec. 14, 2023 (Year: 2006).*

(Continued)

*Primary Examiner* — Yogesh C Garg
(74) *Attorney, Agent, or Firm* — HUNTON ANDREWS KURTH LLP

(57) ABSTRACT

A system is provided including a database and a server. The server is configured to: retrieve online merchant terms associated with a merchant; store in the database the online merchant terms; apply a time stamp to the online merchant terms; associate the online merchant terms with the merchant in the database; assign the online merchant terms a date range in the database; receive information of a transaction of a user; search, based on the information of the transaction, the database for the online merchant terms; determine whether the online merchant terms are applicable to the transaction; associate in the database the online merchant terms with the transaction upon determining that the online merchant terms are applicable to the transaction; and responsive to receipt of a selection of viewing online merchant terms associated with the transaction, transmit the online merchant terms for display to the user.

17 Claims, 8 Drawing Sheets

(58) Field of Classification Search
USPC .......................................................... 705/26.1
See application file for complete search history.

(56) References Cited

U.S. PATENT DOCUMENTS

| | | | |
|---|---|---|---|
| 7,967,196 B1* | 6/2011 | Bierbaum | ............ G06Q 20/127 |
| | | | 235/375 |
| 8,515,923 B2 | 8/2013 | Wenn et al. | |
| 8,631,504 B2 | 1/2014 | Joshi et al. | |
| 10,032,185 B2 | 7/2018 | Watfa et al. | |
| 11,017,369 B1 | 5/2021 | Brock et al. | |
| 11,100,554 B1 | 8/2021 | Gupta et al. | |
| 11,385,613 B2 | 7/2022 | Ludwig et al. | |
| 2002/0046081 A1 | 4/2002 | Albazz et al. | |
| 2002/0138577 A1 | 9/2002 | Teng et al. | |
| 2003/0023622 A1 | 1/2003 | Obermeyer et al. | |
| 2003/0164862 A1* | 9/2003 | Cadiz | .................. G06Q 10/107 |
| | | | 715/838 |
| 2003/0208719 A1 | 11/2003 | Fay | |
| 2004/0216039 A1 | 10/2004 | Lane et al. | |
| 2004/0261025 A1 | 12/2004 | Rizk et al. | |
| 2005/0108260 A1 | 5/2005 | Wenn et al. | |
| 2005/0152378 A1 | 7/2005 | Bango et al. | |
| 2005/0211784 A1* | 9/2005 | Justin | ............... G06Q 20/40145 |
| | | | 235/492 |
| 2006/0010082 A1 | 1/2006 | Gee et al. | |
| 2006/0184539 A1 | 8/2006 | Blake et al. | |
| 2007/0162320 A1 | 7/2007 | Joshi et al. | |
| 2009/0083057 A1 | 3/2009 | Bhakta et al. | |
| 2009/0182626 A1* | 7/2009 | Egan | ...................... G06Q 40/06 |
| | | | 705/36 R |
| 2009/0182671 A1 | 7/2009 | Kloppers et al. | |
| 2010/0125510 A1 | 5/2010 | Smith et al. | |
| 2011/0125642 A1 | 5/2011 | Kamal | |
| 2012/0290909 A1* | 11/2012 | Speirs | .................. G06F 16/955 |
| | | | 715/205 |
| 2012/0310692 A1 | 12/2012 | Maiya et al. | |
| 2013/0013529 A1 | 1/2013 | Chheda et al. | |
| 2014/0115498 A1* | 4/2014 | Jackson | ................. G06Q 50/01 |
| | | | 715/753 |
| 2014/0279058 A1* | 9/2014 | Mullins | .............. G06Q 30/0276 |
| | | | 705/14.72 |
| 2016/0027123 A1 | 1/2016 | Bong et al. | |
| 2016/0110374 A1 | 4/2016 | Wetherall et al. | |
| 2016/0343050 A1* | 11/2016 | D'Souza | ............ G06Q 30/0605 |
| 2017/0039182 A1 | 2/2017 | Ridgeway et al. | |
| 2017/0178074 A1 | 6/2017 | Marsh | |
| 2018/0150442 A1 | 5/2018 | Chieu et al. | |
| 2019/0377724 A1* | 12/2019 | Pennington | .......... G06Q 20/389 |
| 2020/0314476 A1* | 10/2020 | Regis | ............. H04N 21/44008 |
| 2021/0192520 A1* | 6/2021 | Patel | ...................... G06Q 20/02 |
| 2021/0217003 A1* | 7/2021 | Karaivanov | ......... G06Q 20/405 |

FOREIGN PATENT DOCUMENTS

| | | | | |
|---|---|---|---|---|
| EP | 1672570 A1 | 6/2006 | | |
| GB | 2378533 A | 2/2003 | | |
| KR | 100481139 B1 * | 4/2005 | ............ | G06F 17/60 |
| WO | 2004074972 A2 | 9/2004 | | |
| WO | 2005017722 A1 | 2/2005 | | |
| WO | 2011116140 A1 | 9/2011 | | |
| WO | 2012045117 A1 | 4/2012 | | |

OTHER PUBLICATIONS

Article, "JP Morgan Chase Bank Assigned Patent for System and Method for Combined Reconciliation of Co-branded Card Promotion and Settlement of Private Label Card Accounts" Targeted News Services [Washington, D.C.] Jun. 2, 2011; retrieved from Dialog Databased on Jul. 15, 2022 (Year: 2011).

* cited by examiner

SYSTEMS AND METHODS FOR RETRIEVING ONLINE MERCHANT TERMS OF A MERCHANT AND ASSOCIATING THE SAME WITH TRANSACTIONS

CROSS-REFERENCE TO RELATED APPLICATIONS

The subject application is a continuation of U.S. patent application Ser. No. 16/935,675 filed Jul. 22, 2020, the contents of which are hereby incorporated by reference in their entirety.

FIELD OF THE INVENTION

The present disclosure relates generally to online shopping, and more particularly, to systems and methods for retrieving online merchant terms of a merchant and associating the online merchant terms with transactions.

BACKGROUND

Online shopping and online selling are increasing in popularity due to convenience and a wide range of product and service offerings. Merchants generally have terms and policies for their online shops, such as return policies, shipping policies, product warranties, and the like. These online merchant terms are typically posted on a web page of the merchant's web site of the merchant where a user or customer can access them. However, these online merchant terms are often not conspicuous and it is not usually obvious when they are updated. Merchants can change their online merchant terms at any time, which can lead to problematic scenarios such as an immediate change to a shipping policy or return policy after a customer makes a purchase. For returning customers, they may be unaware of changes to the online merchant terms that might affect them.

These and other deficiencies exist. Accordingly, there is a need to provide systems and methods that overcome these deficiencies to increase accessibility of up-to-date online merchant terms of merchants for transactions.

SUMMARY

Aspects of the disclosed technology include systems and methods for retrieving online merchant terms of a merchant and associating the online merchant terms with transactions.

Various embodiments describe systems and methods for implementing and managing the online merchant terms for transactions.

Embodiments of the present disclosure provide a system. The system can comprise a database and a server in data communication with the database. The server is configured to: retrieve a first version of online merchant terms associated with a merchant; store in the database the first version of the online merchant terms; apply a time stamp to the first version of the online merchant terms, wherein the time stamp is indicative of a retrieval time and a retrieval date at which the first version of the online merchant terms is retrieved; associate the first version of the online merchant terms with the merchant in the database; assign the first version of the online merchant terms a first date range in the database, wherein the first date range is indicative of a date range when the first version of the online merchant terms is effective; receive information of a first transaction of a user to identify a transaction time and a transaction date of the first transaction, the information of the first transaction comprising the transaction time and the transaction date of the first transaction and a merchant identifier indicating the first transaction as be a transaction from the merchant, wherein the transaction time and the transaction date of the first transaction are identified by extracting the transaction time and the transaction date of the first transaction from the information of the first transaction; search, based on the information of the first transaction, the database for the first version of the online merchant terms; determine whether the first version of the online merchant terms is applicable to the first transaction based on the time stamp of the first version of the online merchant terms, the first date range, and the transaction time and the transaction date of the first transaction; associate in the database the first version of the online merchant terms with the first transaction upon determining that the first version of the online merchant terms is applicable to the first transaction; and responsive to receipt of a selection of viewing online merchant terms associated with the first transaction, transmit the first version of the online merchant terms for display to the user.

Embodiments of the present disclosure provide a server. The server comprises a memory, a display and a processor coupled to the memory and the display. The processor is configured to: retrieve a first version of online merchant terms associated with a merchant; store in a database the first version of the online merchant terms; apply a time stamp to the first version of the online merchant terms, wherein the time stamp is indicative of a retrieval time and a retrieval date at which the first version of the online merchant terms is retrieved; associate the first version of the online merchant terms with the merchant in the database; assign the first version of the online merchant terms a first date range in the database, wherein the first date range is indicative of a date range when the first version of the online merchant terms is effective in the database; receive information of a first transaction of a user to identify a transaction time and a transaction date of the first transaction, the information of the first transaction comprising the transaction time and the transaction date of the first transaction and a merchant identifier indicating the first transaction as be a transaction from the merchant, wherein the transaction time and the transaction date of the first transaction are identified by extracting the transaction time and the transaction date of the first transaction from the information of the first transaction; search, based on the information of the first transaction, the database for the first version of the online merchant terms; determine whether the first version of the online merchant terms is applicable to the first transaction, based on the time stamp of the first version of the online merchant terms, the first date range, and the transaction time and the transaction date of the first transaction; associate in the database the first version of the online merchant terms with the first transaction upon determining that the first version of the online merchant terms is applicable to the first transaction of; and responsive to receipt of a selection of viewing online merchant terms associated with the first transaction, transmit the first version of the online merchant terms for display to the user.

Embodiments of the present disclosure provide a method. The method comprises: retrieving, by a server, a first version of online merchant terms associated with a merchant; storing, by the server, in a database the first version of the online merchant terms; applying, by the server, a time stamp to the first version of the online merchant terms, wherein the time stamp is indicative of a retrieval time and a retrieval date at which the first version of the online merchant terms is retrieved; associating, by the server, the first version of the online merchant terms with the merchant in the database; assigning, by the server, the first version of the online merchant terms a first date range in the database, wherein the first date range is indicative of a date range when the first version of the online merchant terms is effective; receiving, by the server, information of a first transaction of a user to identify a transaction time and a transaction date of the first transaction, the information of the first transaction comprising the transaction time and the transaction date of the first transaction and a merchant identifier indicating the first transaction as be a transaction from the merchant, wherein the transaction time and the transaction date of the first transaction are identified by extracting the transaction time and the transaction date of the first transaction from the information of the first transaction; searching, by the server, based on the information of the first transaction, the database for the first version of the online merchant terms; determining, by the server, whether the first version of the online merchant terms is applicable to the first transaction, based on the time stamp of the first version of the online merchant terms, the first date range, and the transaction time and the transaction date of the first transaction; associating, by the server, in the database the first version of the online merchant terms with the first transaction upon determining that the first version of the online merchant terms is applicable to the first transaction; and responsive to receipt of a selection of viewing online merchant terms associated with the first transaction, transmit, by the server, the first version of the online merchant terms for display to the user.

Further features of the disclosed systems and methods, and the advantages offered thereby, are explained in greater detail hereinafter with reference to specific example embodiments illustrated in the accompanying drawings.

DETAILED DESCRIPTION OF EXAMPLE EMBODIMENTS

Figure 1:
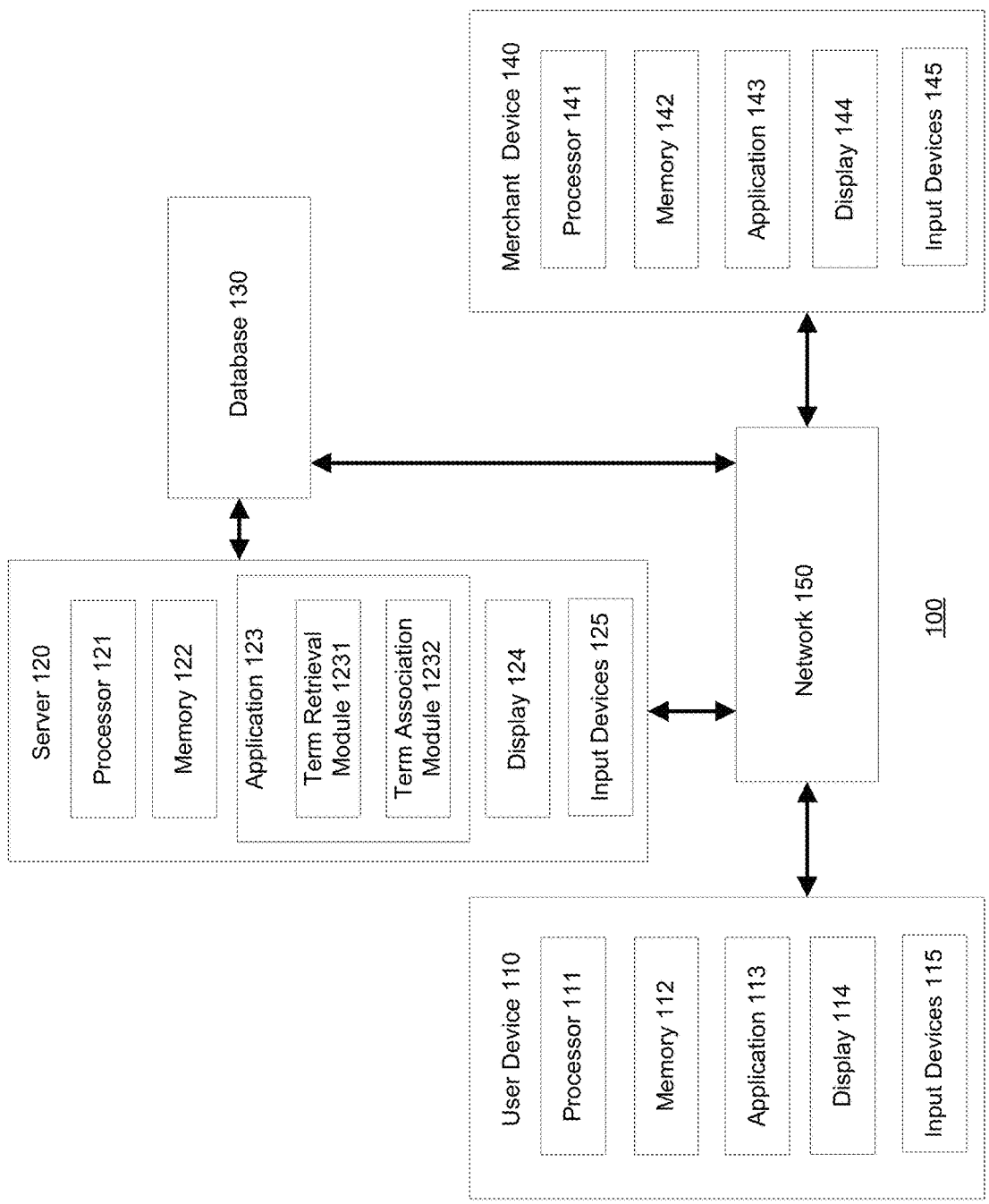
FIG. 1 is a diagram of a system for retrieving online merchant terms of a merchant and associating the online merchant terms with transactions according to an example embodiment.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Example embodiments of the present disclosure provide systems and methods for retrieving online merchant terms of merchants, and associating the online merchant terms with corresponding merchants in a data store through, for example, corresponding merchant records for a date range. The online merchant terms are further associated in the data store with user transactions from corresponding merchants, which can be viewed in an interface, such as a bank or credit card statement interface.

The online merchant terms may be retrieved on a regular time interval basis using a screen scraper, an application programming interface (API), or other methods. Each retrieved version of the online merchant terms may be analyzed against a previous version of the online merchant terms stored in the data store to check for differences. If there are no differences, the recently retrieved version of the online merchant terms may be discarded, and the previous version of the online merchant term may then be referred to as the latest version. The date range previously listed for the previous version of the online merchant term may remain the same for the latest version of the online merchant terms. Alternatively, the date range previously listed for the previous version of the online merchant term may be adjusted to be a new date range for the latest version of the online merchant terms, because no differences are identified and the previous version can be expected to remain effective. For example, the end date of the date range previously listed for the previous version may be extended for a certain period of time (e.g., 30 days), such that the new date range is longer than the date range previously listed for the previous version.

If there are differences, the recently retrieved version of the online merchant terms can then be referred to as the latest version of the online merchant terms to replace the previous version of the online merchant terms. A new date range may be assigned to the latest version of the online merchant terms. This new date range may include a start date on which the recently retrieved version is retrieved. The previous version may be discarded if there are no transactions associated with it, which may reduce the need for storage space. However, the previous version may be retained if there have at least one transaction associated with it. If the previous version is retained, a new end date may be assigned to the date range listed for the previous version. This new end date of the previous version may be the date on which the recently retrieved version is retrieved. That is, this new end date of the previous version is the start date of the latest version, such that a new version of the online merchant terms (i.e., the latest version different than the previous version) has an assigned start date of the date on which the recently retrieved version is retrieved, and the previous version has an assigned end date of the date on which the recently retrieved version is retrieved.

When a user opens their bank or credit card statement interface, the user can select an option to review the relevant version of online merchant terms associated with their transactions, for example, purchases they made from corresponding merchants.

In some embodiments, merchants may have online merchant terms that are different from in-store merchant terms. In such scenarios, if no online merchant terms for in-store transactions are available, then the "view terms" option, for example, on the bank or credit card statement interface of the user may be excluded. The user may also elect to monitor the online merchant terms of a merchant and be notified if there is a change to the online merchant terms. Additionally, intelligent triggers may be used to retrieve the online merchant terms at relevant times (e.g., changes in regulation/law, company acquisitions, email triggers, etc.).

Accordingly, embodiments of the present disclosure may advantageously provide the user with easy access and ease of reference to online merchant terms, and to the applicable and relevant versions of those terms. By keeping the user apprised of the current terms and/or applicable terms, embodiments of the present disclosure can promote exercise by the user of his or her rights and options under terms and policies, etc. and reduce the cost and effort associated required to do so. Often users may not make an effort to save or otherwise keep track of online merchant terms, and such users will benefit from embodiments of the present disclosure.

In some embodiments, the online merchant terms may be scraped when a user transaction is received. That is, a scrape of the online merchant terms may be triggered by a user transaction. As described above, the scraped online merchant terms may be analyzed against a version of the online merchant terms currently stored and effective in the data store to check for differences. If there are no differences, the scraped online merchant terms may be discarded. If there are differences, the scraped online merchant terms can then be saved as a new version in the data store to replace the version currently stored in the data store. A new date range may be assigned to the scraped online merchant terms. This new date range may include a start date on which the scraped online merchant terms is stored in the data store. This may ensure the effective dates for the scraped online merchant terms, while still reducing storage required.

In some embodiments, the online merchant terms can be scraped periodically without requiring a transaction to prompt it. For example, the online merchant terms may be scraped hourly, daily, weekly or monthly. As described above, each time when the online merchant terms is scraped, the scraped online merchant terms may be analyzed against a version of the online merchant terms currently stored and effective in the data store to check for differences. If there are no differences, the scraped online merchant terms may be discarded. If there are differences, the scraped online merchant terms can then be saved as a new version in the data store to replace the version currently stored in the data store. A new date range may be assigned to the scraped online merchant terms. This new date range may include a start date on which the scraped online merchant terms is stored in the data store. This may ensure the effective dates for the scraped online merchant terms, while still reducing storage required.

FIG. 1 illustrates a system 100 for retrieving online merchant terms of a merchant and associating the online merchant terms with transactions from the merchant according to an example embodiment. As further discussed below, the system 100 may include a user device 110, a server device 120, a database 130, and a merchant device 140 in communication using a network 150. Although FIG. 1 illustrates single instances of the components, the system 100 may include any number of components.

The user device 110 can be configured to present to a user a user interface from which the user may log into, for example, their bank or credit card account to access their transaction statement stored in the database 130 of the server 120. The user device 110 may be configured to display on the user interface the online merchant terms associated with the transactions, in response to a selection by the user of viewing the online merchant terms. The server 120 may be associated with an institution, such as a financial institution, and can be configured to retrieve from third-parties, such as the merchant device 140, the online merchant terms associated with the transactions, store the retrieved online merchant terms in the database 130, and associate the retrieved online merchant terms with the transactions in the database 130. The merchant device 140 may be associated with a merchant with which the transactions are conducted, for example, online purchases made from the merchant. The merchant device 140 can be configured to store the online merchant terms, for example, on a webpage, and to present a shopping interface on which the user can conduct the transactions with the merchant.

The user device 110 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The user device 110 may include a processor 111, a memory 112, an application 113, a display 114, and input devices 115. The processor 111 may be a processor, a microprocessor, or other processor, and the user device 110 may include one or more of these processors. The processor 111 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 111 may be coupled to the memory 112. The memory 112 may be a read-only memory, write-once read-multiple memory or read/write memory, e.g., RAM, ROM, and EEPROM, and the user device 110 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 112 may be configured to store one or more software applications, such as application 113, and other data, such as private and personal information.

The application 113 may comprise one or more software applications comprising instructions for execution on the user device 110. In some examples, the user device 110 may execute one or more applications, such as software applications, that enable, for example, network communications with one or more components of the system 100, transmit and/or receive data, and perform the functions described herein such as presenting the online merchant terms to a user of the user device 110. Upon execution by the processor 111, the application 113 may provide the functions described in this specification, specifically to execute and perform the steps and functions in the process flows described below. Such processes may be implemented in software, such as software modules, for execution by computers or other machines. The application 113 may provide graphic user interfaces (GUIs) through which users may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The user device 110 may further include a display 114 and input devices 115. The display 114 may be any type of device for presenting visual information such as a computer monitor, a flat panel display, and a mobile device screen, including liquid crystal displays, light-emitting diode displays, plasma panels, and cathode ray tube displays. The input devices 115 may include any device for entering information into the user device 110 that is available and supported by the user device 110, such as a touch-screen, keyboard, mouse, cursor-control device, touch-screen, microphone, digital camera, video recorder or camcorder. These devices may be used to enter information and interact with the software and other devices described herein such as selecting an option of viewing the online merchant terms.

The server 120 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 120 may include a processor 121, a memory 122, and an application 123. The processor 121 may be a processor, a microprocessor, or other processor, and the server 120 may include one or more of these processors. The processor 121 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 121 may be coupled to the memory 122. The memory 122 may be a read-only memory, write-once read-multiple memory or read/write memory, e.g., RAM, ROM, and EEPROM, and the server 120 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 122 may be configured to store one or more software applications, such as the application 123, and other data, such as user's shopping and financial account information.

The application 123 may comprise one or more software applications, such as term retrieval module 1231 and term association module 1232, comprising instructions for execution on the server 120. In some examples, the server 120 may execute one or more applications, such as software applications, that enable, for example, network communications with one or more components of the system 100, transmit and/or receive data, and perform the functions described herein. Upon execution by the processor 121, the application 123 may provide the functions described in this specification, specifically to execute and perform the steps and functions in the process flows described below. For example, the term retrieval module 1231 of the application 123 may be executed to perform retrieving the online merchant terms for various sources and storing the retrieved online merchant terms in the database 130; the term association module 1232 of the application 123 may be executed to perform associating the retrieved online merchant terms with a corresponding merchant and transactions in the database 130. Such processes may be implemented in software, such as software modules, for execution by computers or other machines. The application 123 may provide GUIs through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The server 120 may further include a display 124 and input devices 125. The display 124 may be any type of device for presenting visual information such as a computer monitor, a flat panel display, and a mobile device screen, including liquid crystal displays, light-emitting diode displays, plasma panels, and cathode ray tube displays. The input devices 125 may include any device for entering information into the server 120 that is available and supported by the server 120, such as a touch-screen, keyboard, mouse, cursor-control device, touch-screen, microphone, digital camera, video recorder or camcorder. These devices may be used to enter information and interact with the software and other devices described herein.

The database 130 may be one or more databases configured to store date, including without limitation, private information of users, financial accounts of users, online merchant terms of merchants, transactions of users, and merchant records indicative of corresponding merchants. The database 130 may comprise a relational database, a non-relational database, or other database implementations, and any combination thereof, including a plurality of relational databases and non-relational databases. In some examples, the database 130 may comprise a desktop database, a mobile database, or an in-memory database. Further, the database 130 may be hosted internally by the server 120 or may be hosted externally of the server 120, such as by a server, by a cloud-based platform, or in any storage device that is in data communication with the server 120.

The merchant device 140 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The merchant device 140 may include a processor 141, a memory 142, and an application 143. The processor 141 may be a processor, a microprocessor, or other processor, and the merchant device 140 may include one or more of these processors. The processor 141 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 141 may be coupled to the memory 142. The memory 142 may be a read-only memory, write-once read-multiple memory or read/write memory, e.g., RAM, ROM, and EEPROM, and the merchant device 140 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 142 may be configured to store one or more software applications, such as the application 143, and other data, such as user's shopping and financial account information.

The application 143 may comprise one or more software applications comprising instructions for execution on the merchant device 140. In some examples, the merchant device 140 may execute one or more applications, such as software applications, that enable, for example, network communications with one or more components of the system 100, transmit and/or receive data, and perform the functions described herein. Upon execution by the processor 141, the application 143 may provide the functions described in this specification, specifically to execute and perform the steps and functions in the process flows described below. For example, the application 143 may be executed to perform storing the online merchant terms on a web page, and transmitting the online merchant terms to the server 120. The application 143 may also be executed to perform processing transactions of a user who may shop online from the merchant. Such processes may be implemented in software, such as software modules, for execution by computers or other machines. The application 143 may provide GUIs through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The merchant device 140 may further include a display 144 and input devices 145. The display 144 may be any type of device for presenting visual information such as a computer monitor, a flat panel display, and a mobile device screen, including liquid crystal displays, light-emitting diode displays, plasma panels, and cathode ray tube displays. The input devices 145 may include any device for entering information into the merchant device 140 that is available and supported by the merchant device 140, such as a touch-screen, keyboard, mouse, cursor-control device, touch-screen, microphone, digital camera, video recorder or camcorder. These devices may be used to enter information and interact with the software and other devices described herein.

The system 100 may include one or more networks 150. In some examples, the network 150 may be one or more of a wireless network, a wired network or any combination of wireless network and wired network, and may be configured to connect the user device 110, the server 120, the database 130, and the merchant device 140. For example, the network 150 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, the network 150 may include, without limitation, telephone lines, fiber optics, IEEE Ethernet 902.3, a wide area network, a wireless personal area network, a LAN, or a global network such as the Internet. In addition, the network 150 may support an Internet network, a wireless communication network, a cellular network, or the like, or any combination thereof. The network 150 may further include one network, or any number of the exemplary types of networks mentioned above, operating as a stand-alone network or in cooperation with each other. The network 150 may utilize one or more protocols of one or more network elements to which they are communicatively coupled. The network 150 may translate to or from other protocols to one or more protocols of network devices. Although the network 150 is depicted as a single network, it should be appreciated that according to one or more examples, the network 150 may comprise a plurality of interconnected networks, such as, for example, the Internet, a service provider's network, a cable television network, corporate networks, such as credit card association networks, and home networks. The network 150 may further comprise, or be configured to create, one or more front channels, which may be publicly accessible and through which communications may be observable, and one or more secured back channels, which may not be publicly accessible and through which communications may not be observable.

In some examples, communications between the user device 110, server 120, and merchant device 140 using the network 150 can occur using one or more front channels and one or more secure back channels. A front channel may be a communication protocol that employs a publicly accessible and/or unsecured communication channel such that a communication sent to the user device 110, server 120, and/or merchant device 140 may originate from any other device, whether known or unknown to the user device 110, server 120, and/or merchant device 140, if that device possesses the address (e.g., network address, Internet Protocol (IP) address) of the user device 110, server 120, and/or merchant device 140. Exemplary front channels include, without limitation, the Internet, an open network, and other publicly-accessible communication networks. In some examples, communications sent using a front channel may be subject to unauthorized observation by another device. In some examples, front channel communications may comprise Hypertext Transfer Protocol (HTTP) secure socket layer (SSL) communications, HTTP Secure (HTTPS) communications, and browser-based communications with a server or other device.

A secure back channel may be a communication protocol that employs a secured and/or publicly inaccessible communication channel. A secure back channel communication sent to the user device 110, server 120, and/or merchant device 140 may not originate from any device, and instead may only originate from a selective number of parties. In some examples, the selective number of devices may comprise known, trusted, or otherwise previously authorized devices. Exemplary secure back channels include, without limitation, a closed network, a private network, a virtual private network, an offline private network, and other private communication networks. In some examples, communications sent using a secure back channel may not be subject to unauthorized observation by another device. In some examples, secure back channel communications may comprise Hypertext Transfer Protocol (HTTP) secure socket layer (SSL) communications, HTTP Secure (HTTPS) communications, and browser-based communications with a server or other device.

In some examples, the user device 110 can be associated with a user and may be operated by that user, such as a customer. The server 120 can be associated with a financial institution, such as a bank or a credit card company that offers financial services to the user of the user device 110. The merchant device 140 can be associated with a merchant with which the user of the user device 110 may conduct transactions, and may be operated by that merchant, such as an online retailer.

Figure 2:
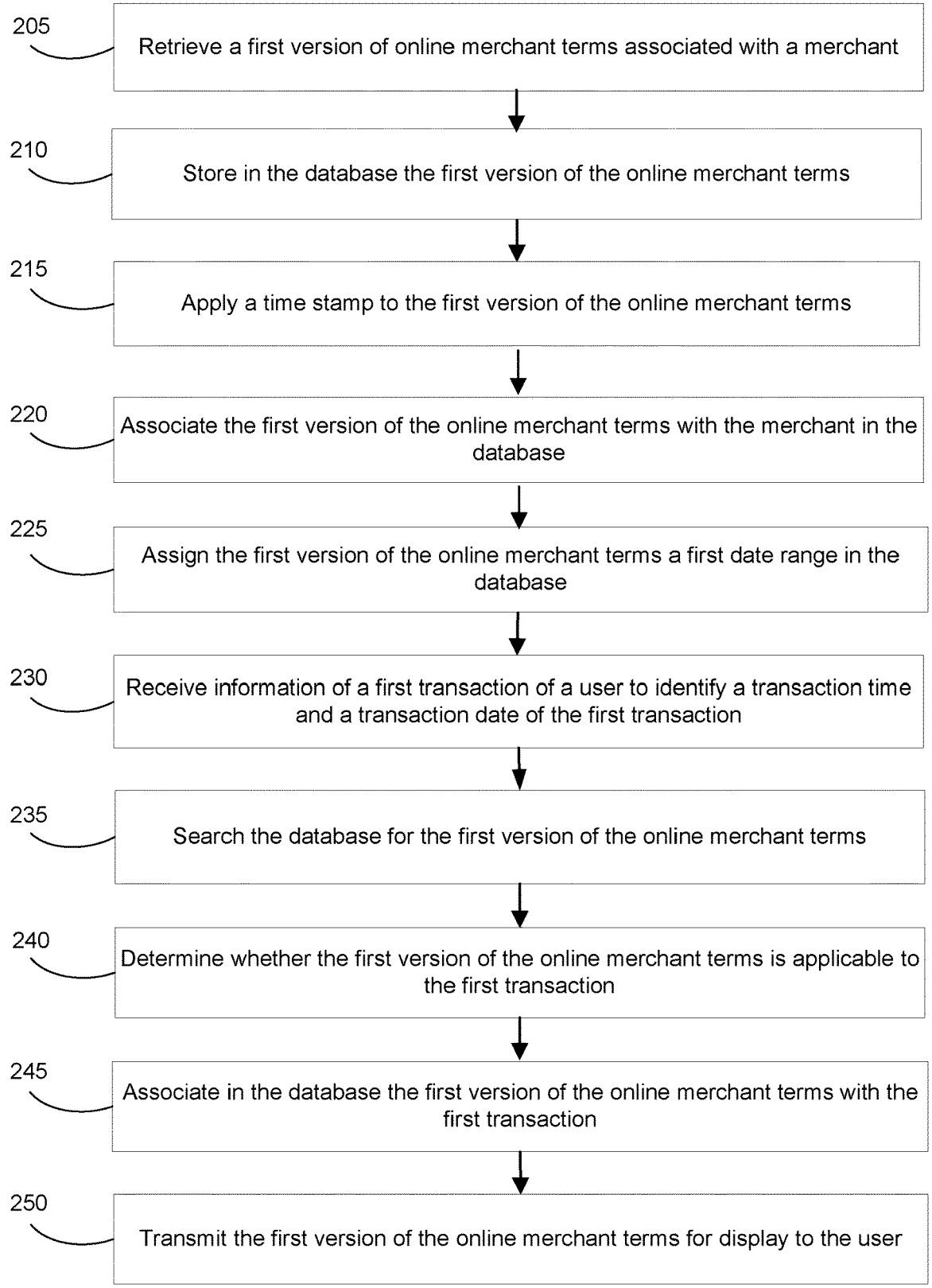
FIG. 2 is a flow chart illustrating a method of retrieving online merchant terms of a merchant and associating the online merchant terms with transactions according to an example embodiment.

FIG. 2 illustrates a method 200 of retrieving online merchant terms of a merchant and associating the online merchant terms with transactions according to an example embodiment. FIG. 2 may reference the same or similar components as those illustrated in FIG. 1, including a user device, a server, a database, and a merchant device.

When a user makes a purchase online from a merchant, there may be online merchant terms of that merchant associated with that purchase. For example, the online merchant terms may include some type of agreement that requires the user to enter into with that merchant. An example of the agreement may be that the user would have to pay upfront for a service purchased from the merchant (e.g., a user rents a car online from a car rental agency). Other examples of online merchant terms may include: a merchant may warrant their service for a certain amount of time; a merchant may set policies for whether or not they accept returns and how those returns are going to work; whether they have a restocking fee on a return; how long a user has to choose whether or not to return a product; and the like.

However, these online merchant terms may be many pages of legalese and the user may not remember what the online merchant terms are by the time that the user seeks to exercise his or her rights under the online merchant terms, especially if a significant period of time has elapsed. For example, the user may have bought something a week ago, a month ago, or a year ago, and the online merchant terms changed after that purchase. Therefore, the user needs the ability to be able to look up what the online merchant terms were that are applicable to their purchase. That is, the user may need to know what the online merchant terms were at the time of the purchase which may have been made a long time ago, in order to assess their options with respect to that purchase. Herein, the method 200 describes an example embodiment of providing the user the online merchant terms that were effective at the time when their purchases were made.

In step 205, the server 120 may retrieve a first version of online merchant terms associated with a merchant. For example, upon receiving a transaction of the user who may purchase something from the merchant device 140, the server 120 may retrieve the online merchant terms associated with the transaction of the user. The server 120 may be, for example, a credit card company that issues a credit card to the user who uses the credit card to pay the transaction. When the merchant charges to the credit card of the user for the transaction, the server 120 receives the transaction that may include information indicative of the merchant based on which the server 120 may retrieve the online merchant terms. Alternatively, the server 120 may retrieve the online merchant terms based on a merchant already stored in the database 130 even if a transaction associated with the merchant has not been received. For example, a merchant may be a popular merchant to users, and users may have a highly likelihood of conducting transactions with that merchant in the future, the server 120 may then generate a merchant record for that merchant that may include a name and address of the merchant and a website link of the merchant, and store the merchant record of the merchant in the database 130. The server 120 may then retrieve the online merchant terms based on the merchant record of the merchant. Alternatively, the server 120 may retrieve the online merchant terms based on history of transactions associated with the merchant that have been stored in the database. The server 120 may retrieve the online merchant terms through the term retrieval module 1231 of the application 123.

The server 120 may retrieve the online merchant terms using different methods and techniques. For example, the server 120 may web-scrape the first version of the online merchant terms by accessing a uniform resource locator (URL) web page on which the first version of the online merchant terms is presented. In some embodiments, the server 120 may retrieve the online merchant terms by receiving a URL link from the user and then accessing the URL link to locate a web page on which the first version of the online merchant terms is presented. In some embodiments, the server 120 may retrieve the online merchant terms by calling an application programming interface (API) through which the first version of the online merchant terms is accessed by the server. In some embodiments, the server 120 may retrieve the online merchant terms by web-crawling the World Wide Web to locate a web page on which the first version of the online merchant terms is presented. Details of retrieving the online merchant terms using different methods and techniques will be described in FIG. 3.

In step 210, the retrieved first version of the online merchant terms is stored in the database 130. The retrieved online merchant terms may be further formatted and indexed in the database 130. The retrieved online merchant terms may be stored in the database 130 as various forms, which may include but not limited to, a text file, a structured data format (e.g., an Extensible Markup Language (XML) document, a JavaScript Object Notation (JSON) document), and so forth. In addition, the retrieved online merchant terms may also be stored as a portable document format (PDF) file, an image file, an audio file, a video file, and/or an audio-video file in a file storage location such as a cloud storage offered by a cloud computing service provider. The database 130 may store links to the files stored in the file storage location.

In step 215, the server 120 may apply a first time stamp to the first version of the online merchant terms in the database 130. The first time stamp is indicative of a retrieval time and a retrieval date at which the first version of the online merchant terms is retrieved. The server 120 may also apply a second time stamp to the first version of the online merchant terms. The second time stamp is indicative of a storage time and a storage date at which the first version of the online merchant terms is stored in the database 130. The first and second time stamps may be the same or may be different. For example, when the server 120 retrieves the online merchant terms and does not store them in the database 130 soon enough, the first and second time stamps can be different. The first and second time stamps can be in various time formats, such as a 12-hour format, a 24-hour format, and the like.

In step 220, the server 120 may associate the first version of the online merchant terms with the merchant in the database 130. For example, the server 120 may associate the online merchant terms with the merchant through a merchant record of the merchant stored in the database 130. The merchant record may be a record comprising the merchant name, merchant address, merchant domain name, merchant identification, and the like.

In step 225, the server 120 may assign the first version of the online merchant terms a first date range in the database, wherein the first date range is indicative of a date range when the first version of the online merchant terms is effective in the database 130. For example, the first version of the online merchant terms may be stored in the database for the first date range (e.g., 180 days, one year, or the like). When the first date range expires, the first version of the online merchant terms may be discarded, archived, updated or retained. If the online merchant terms are updated or retained, a new date range may be assigned by the server 120. The date range is a time duration of the first version of the online merchant terms being stored in the database 130, which may not be the actual effective date range of the online merchant terms. For example, the first version of the online merchant terms may have taken effect by the merchant before the first version of the online merchant terms is retrieved and stored in the database 130 by the server 120.

In step 230, the server 120 may receive information of a first transaction of a user to identify a transaction time and a transaction date of the first transaction. The information of the first transaction may comprise the transaction time and the transaction date of the first transaction and a merchant identifier indicating the first transaction as being a transaction from the merchant. The transaction time and the transaction date of the first transaction are identified by extracting the transaction time and the transaction date of the first transaction from the information of the first transaction.

The server 120 may receive the information of the first transaction from the user device 110 through the application 113. For example, when the user of the device 110 receives the information of the first transaction from the merchant, the user of the device 110 may transmit the information of the first transaction to the serer 120. The information of the first transaction may be included in an electronic product or service receipt the user received from the merchant, an electronic order message the user received from the merchant, an electronic shipping message the user received from the merchant, or the like.

The server 120 may receive the information of the first transaction from a sale terminal associated with the merchant. For example, when the user shops online on a web portal of the merchant, the web portal may transmit the information of the transaction to the server 120.

The server 120 may also receive the information of the first transaction from the merchant device 140 through the application 143. For example, the merchant device 140 may receive the information of the transaction from a shopping terminal associated with the merchant, and transmit the information of the transaction to the server 120.

In step 235, the server 120 may search, based on the information of the first transaction, the database 130 for the first version of the online merchant terms. After the first version of the online merchant terms is stored and associated with the merchant in the database 130, the server 120 may search the database 130 for the first version of the online merchant terms when receiving the first transaction. The server 120 may identify the merchant name from the information of the first transaction, and search the database 130 according to the identified merchant name. By the merchant name, the online merchant terms associated with the merchant can be located in the database 130. If no online merchant terms associated with the identified merchant name is found in the database 130, the method 200 may flow back to the step 205 in which the online merchant terms associated with the identified merchant name can retrieved.

In step 240, the server 120 may determine whether the first version of the online merchant terms is applicable to the first transaction based on the time stamp of the first version of the online merchant terms, the first date range, and the transaction time and the transaction date of the first transaction. After the first version of the online merchant terms is located in the database 130, the server 120 may determine whether the first transaction falls within the relevancy time period, for example, the first date range assigned to the online merchant terms. If the online merchant terms are determined to be applicable to the transaction, the method 200 proceeds to the next step. If the online merchant terms are determined not to be applicable to the transaction, the method 200 flows back to the step 205 in which another version or copy of the online merchant terms that is applicable to the transaction may be retrieved.

In some embodiments, there may be multiple copies of the merchant online terms associated with the merchant stored in the database 130. Each copy of the online merchant terms may have been assigned a different date range and/or may be applicable to different transactions involved with the merchant. In such scenario, the server 120 may determine which copy of the online merchant terms is applicable to a transaction, for example, by comparing the time stamp of the transaction to the data range of a copy of the online merchant terms. The applicability of the online merchant terms may also be filtered based on whether a transaction is a card-present transaction or not a card-present transaction. For instance, a user may buy things from a merchant in store or may buy things from the merchant online. If the transaction is a card-present transaction indicating that the user physically handed the card at a point of sale terminal, then the transaction may not be bound by the online merchant terms. If the transaction is not a card-present transaction (i.e., an online transaction), then the transaction may be further determined to be bound by which copy of the online merchant terms based on the time stamp of the transaction and the date range of that copy (e.g., whether the transaction time falls within the time period of the date range of that copy of the online merchant terms).

In step 245, the sever 120 may associate in the database 130 the first version of the online merchant terms with the first transaction upon determining that the first version of the online merchant terms is applicable to the first transaction. The server 120 may perform the association through the term association module 1232 of the application 123 in FIG. 1.

Figure 4:
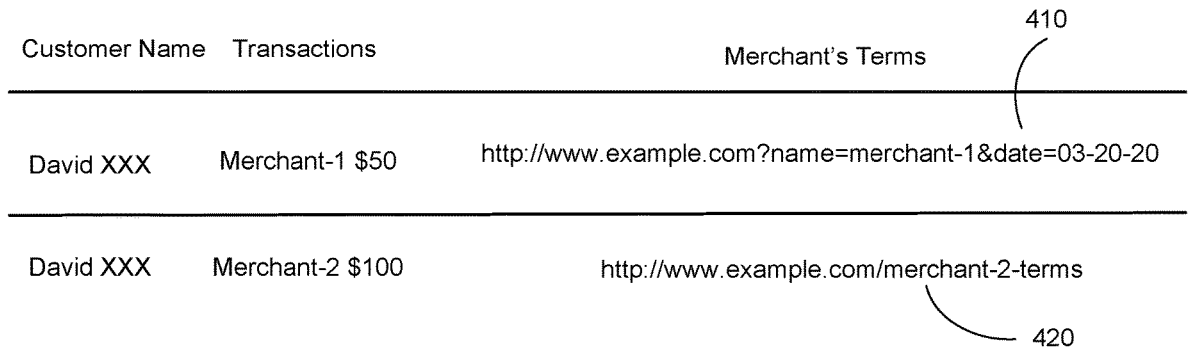
FIG. 4 is a diagram of associating online merchant terms with transactions according to an example embodiment.

The online merchant terms associated with the transaction may be exposed through some type of URL incorporating query parameters. The query parameters may be determined based on the information of the transaction, for example, the merchant name, the transaction date and time, and so forth. As illustrated in FIG. 4, an example of a user transaction in which a credit card is used to purchase something of $50 from merchant-1 on Mar. 20, 2020, a URL incorporating the name of merchant-1 and transaction date as query parameters of http://www.database130.com?name=merchant-1&date=03-20-20 (block 410 in FIG. 4) can expose the terms associated with this transaction. This URL can be designated to refer to the online merchant terms-1 that is still effective in the database 130 on Mar. 20, 2020 (i.e., the transaction time Mar. 20, 2020 falls within the date range of the online merchant terms in the database 130). Alternatively, the date of Mar. 20, 2020 in the query parameters may be other dates as long as a date can indicate the online merchant terms-1 are still effective on the transaction date in the database 130. For example, an expiration date (e.g., 06-20-2020) of the online merchant terms can be used as a date in the query parameters, which is a date later than the transaction date of Mar. 20, 2020. Further, the query parameters may include other parameters such as a transaction identification (ID).

In some embodiments, a regular URL that does not contain query parameters may be specified for exposing the association of the online merchant terms with the transaction. For example, as shown in block 420 of FIG. 4, for a user transaction in which a credit card is used to purchase something of $100 from merchant-2, a regular URL of http://www.database130.com/merchant-2-terms can be associated with the terms of this transaction. This association can be designated to refer to the online merchant terms-2 stored in the database 130 that is applicable to this transaction.

The regular URL and/or the URL containing query parameters may be limited to a certain number of visiting times out of security reasons. For example, the URL may stop working after it is clicked on 10 times. The URL may be private in some way where the user is required to log in in order to see the online merchant terms associated with that transaction. The URL may reference an API that exposes the online merchant terms stored in the database 130.

Figure 5:
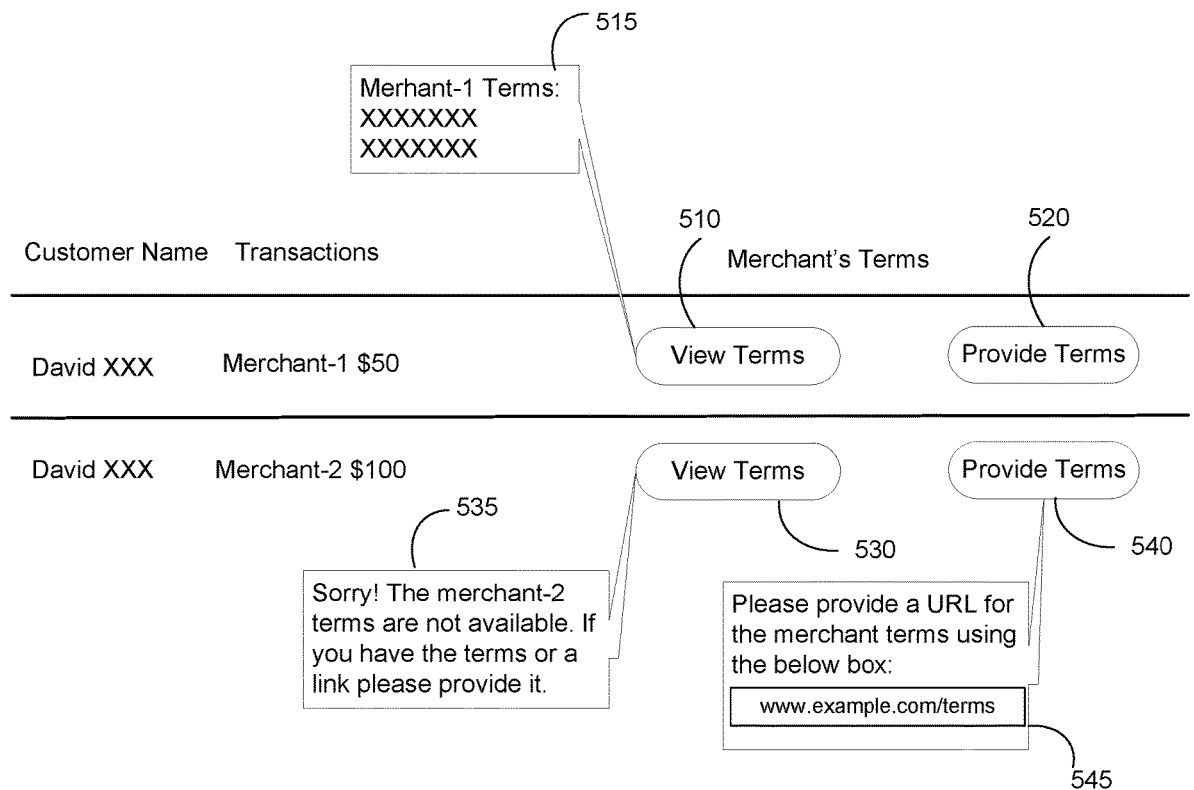
FIG. 5 is a diagram of associating online merchant terms with transactions according to an example embodiment.

In some embodiment, instead of URL links, an interface including at least one button indicative of reviewing the online merchant terms may be used for exposing the associated online merchant terms with the transaction. For example, as shown in FIG. 5, unlike the URL links in FIG. 4, a button 510 and a button 530 may be used to expose the associated online merchant terms of merchant-1 and the online merchant terms of merchant-2 with corresponding transactions.

Like the URL links in FIG. 4, the buttons 510 and 530 may be limited to a certain number of visiting times out of security reasons. For example, the buttons 510 and 530 may each stop working after it is clicked on 10 times. The buttons 510 and 530 may also be private in some way where the user is required to log in in order to see the online merchant terms associated with that transaction. The buttons in FIG. 5 may reference an API that exposes the online merchant terms stored in the database 130.

In step 250, responsive to receipt of a selection of viewing online merchant terms associated with the first transaction, the server 120 transmits the first version of the online merchant terms for display to the user. For example, the server 120 may be associated with a credit card financial institution that issues a credit card to the user. The user may then check the user's credit card transaction statement by logging into the server 120 from the user device 110. The user may be presented by the server 120 on the display of the user device the transaction history of the user, for example, in a PDF file for either last six months, or a year, or the like. In the transaction history, each transaction is associated with the online merchant terms of the corresponding merchant involved in that transaction. When the user determines to view the online merchant terms associated with that transaction, the user may make a selection of reviewing the online merchant terms. In response to the selection of the user, the server 120 transmits the online merchant terms to the user device 110 for display to the user. In the situations where the buttons 510 and 530 are used to expose the online merchant terms, the user may be presented by the server 120 on the display of the user device the transaction history of the user, for example, on an interactable web page for either last six months, or a year, or the like.

Figure 3:
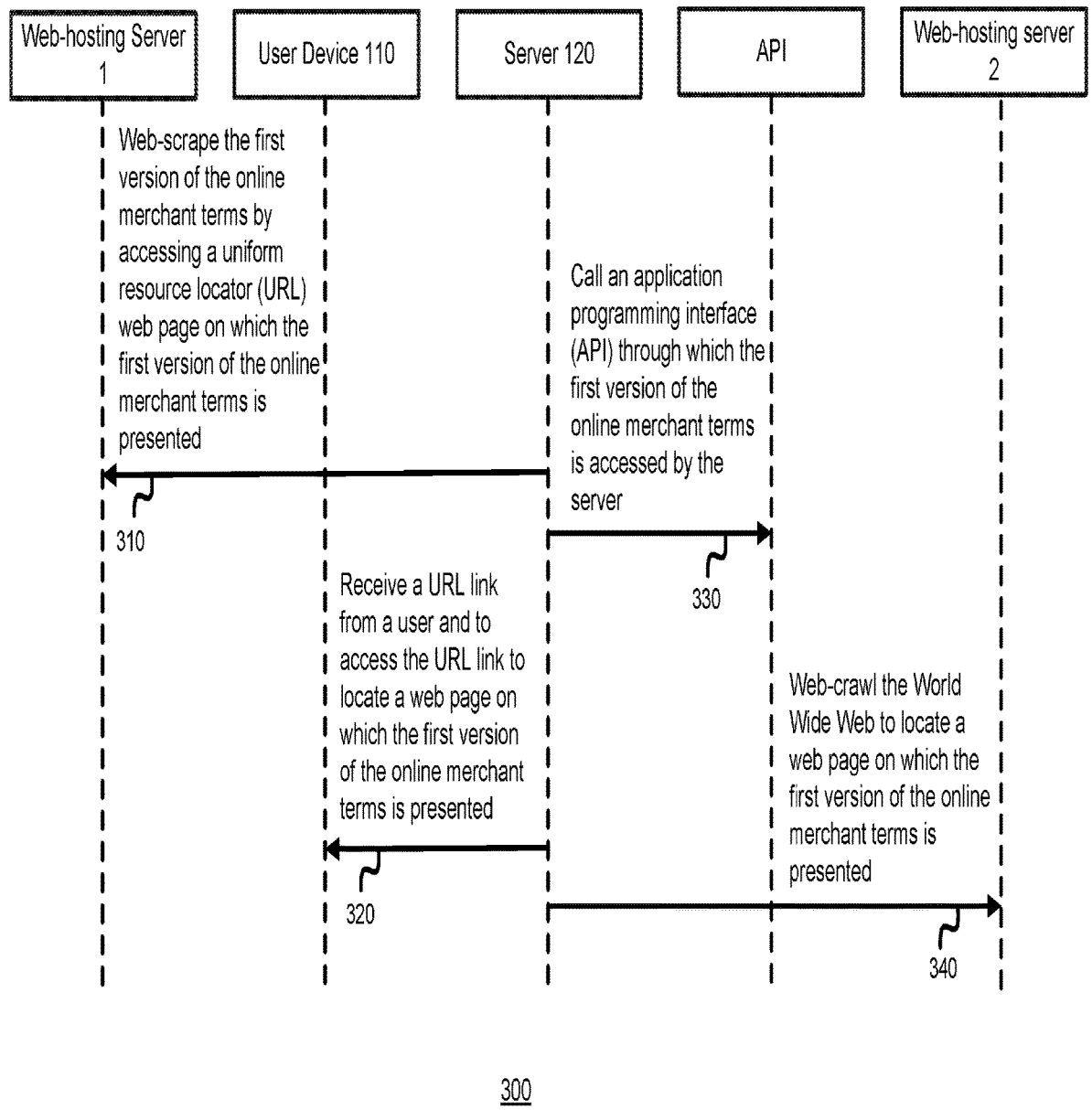
FIG. 3 is a diagram illustrating retrieving online merchant terms of a merchant according to an example embodiment.

FIG. 3 illustrates a sequence flow diagram 300 of retrieving by the server 120 the online merchant terms using different methods and techniques. For example, the server 120 may web-scrape the first version of the online merchant terms by accessing a uniform resource locator (URL) web page (web-hosting server 1) on which the first version of the online merchant terms is presented (block 310). The web page may be hosted by the merchant device 140 or by a third-party associated with the merchant. When the URL web page on which the first version of the online merchant terms is known to the server 120, the server 120 may get the URL and go to the merchant's website to download the online merchant terms, for example, by copying the body of that web page. The URL may be further cached in the server 120 for further access in the future.

In some embodiments, the server 120 may retrieve the online merchant terms by receiving a URL link from the user (via user device 110) and then accessing the URL link to locate a web page on which the first version of the online merchant terms is presented (block 320). Upon receiving a transaction of the user who may purchase something from the merchant device 140, the server 120 may query the database 130 to check if the online merchant terms applicable to the transaction of the user is available in the database 130. If the online merchant terms applicable to the transaction of the user is not available in the database 130, the server 120 may request the user to provide the online merchant terms applicable to the transaction of the user. For example, the user may provide a URL link to the online merchant terms applicable to the transaction of the user. The server 120 then retrieves the URL link from the user and then accesses the URL link to locate a web page on which the first version of the online merchant terms is presented. The server 120 may then download the online merchant terms, for example, by copying the body of that web page. Alternatively, the server 120 may request the user to provide the online merchant terms applicable to the transaction of the user, when the server 120 is unable to retrieve, from the merchant device 140 and a third-party associated with the merchant, the online merchant terms applicable to the transaction of the user.

In some embodiments, the server 120 may retrieve the online merchant terms by calling an application programming interface (API) through which the first version of the online merchant terms is accessed by the server (block 330). If the merchant has an API available, the server 120 may call the API to retrieve the online merchant terms. When there is a third-party service that aggregates those APIs of merchants, the server 120 may call the third-party service and download lots of online merchant terms via those APIs.

In some embodiments, the server 120 may retrieve the online merchant terms by web-crawling the World Wide Web to locate a web page (web-hosting server 2) on which the first version of the online merchant terms is presented (block 340). The server 120 may use a web crawler starting with a list of URLs until the online merchant terms are identified. Various crawling techniques may be used, such as URL normalization, path-ascending crawling, focused crawling, academic-focused crawling, and semantic focused crawler. In web crawling, an algorithm may be created to attempt to find a merchant from a merchant domain that may be associated with their merchant identifier or merchant record in the database 130. The server 120 may also start from a type of web searching engine and search for the merchant. The server 120 may also use a script that works as a web crawler, but looks for online merchant terms. The script may be executed to follow various URLs within a merchant domain and find something that indicates that either the online merchant terms page is identified or that a link to the online merchant terms is identified. If that link is identified, the script may be executed to load it and copy the body of that page.

FIG. 4 illustrates a portion of an example transaction history of a user. Each transaction is assigned a URL link to the online merchant terms of corresponding merchant stored in the database 130. The user may click on the URL link to view the online merchant terms. In a case where the URL is a URL containing query parameters, when the user clicks on the embedded URL link to submit the URL request to the server 120, the sever 120 may search the database 130 for the online merchant terms according to the query parameters. When the server 120 gets the online merchant terms matching the query parameters, the server 120 returns the online merchant terms to the user device 110 that is configured to present the online merchant terms to the user. For example, upon receiving the online merchant terms by the user device 110, the user device 110 can present via a web browser installed on the user device 110 to user a web page containing the received online merchant terms.

In a case where the URL is a regular URL that does not contain query parameters, when the user clicks on the embedded URL link to submit the URL request to the server 120, the server 120 may locate the online merchant terms as specified in the location path of the URL. In this case, the server 120 may further determine whether the located online merchant terms are still effective on the transaction date, for example, by examining a date (e.g., an expiration date) of the located online merchant terms. When the server 120 gets the online merchant terms, the server 120 returns the online merchant terms to the user device 110 of the user that is configured to present the online merchant terms to the user. For example, upon receiving the online merchant terms by the user device 110, the user device 110 can present via a web browser installed on the user device 110 to the user a web page containing the received online merchant terms.

FIG. 5 illustrates a portion of another example transaction history of a user. In this example, instead of URL links, each transaction is associated with at least one button. The at least one button may include one button referring to the online merchant terms involved in that transaction. For example, when the user determines to view the online merchant terms of merchant-1 for the time of his transaction, the user can click on the button 510. In response to the clicking, the server 120 transmits the appropriate online merchant terms of merchant-1 for display to the user, for example, as shown in block 515. In some situations, the online merchant terms of a merchant involved in a transaction may not be available in the database 130. For example, for the transaction involved the merchant-2, a message as shown in block 535 may be displayed to the user when the user clicks on the button 530 to view the online merchant terms-2. In such scenario, the example transaction history interface may be provided with additional buttons, such as buttons 520 and 540 for the user to provide the online merchant terms. For example, when the user clicks on the button 540, a message as shown in block 540 may be displayed for the user to have the user provide, for example, a URL link to the online merchant terms-2. In response to receiving the URL link provided by the user, the server 120 may retrieve the online merchant terms-2 by following the user provided URL link as described in the step 205 of FIG. 1. The server may then store the retrieved online merchant terms in the database 130 and associate it in the database 130 with the merchant-2 and the transaction involved the merchant-2 (e.g., through the button 530) as described in the FIG. 1. As another example, the user may upload a document containing the terms.

The online merchant terms may be stored in the database 130 in various document formats, including but not limited to, a text file (e.g., a plain text format), a structured data format (e.g., a XML document and/or a JSON document), and so forth. In addition, the online merchant terms may also be stored as a PDF file, an image file (e.g., a scanned image file and/or a picture file), an audio file, a video file, and/or an audio-video file in a file storage location such as a cloud storage offered by a cloud computing service provider. The database 130 may store links to the files stored in the file storage location.

For example, when the online merchant terms are stored in PDF format, the online merchant terms can be displayed on the user device 110 as a PDF file for reading by the user. When the online merchant terms are stored in a video format, the online merchant terms can be played on the user device 110 for viewing by the user. When the online merchant terms are stored in a scanned image format, the online merchant terms can be displayed via an image application program on the user device 110 for viewing by the user. When the online merchant terms are stored in an audio format, the online merchant terms can be played on the user device 110 for listening by the user.

As described above, the online merchant terms of various merchants involved in user transactions can be retrieved and stored in a data store (e.g., the database 130) for the users to view when the users check their transaction histories. Each of those transactions could have an inline link (e.g., URLs and/or buttons) where the users are able to click on it and see the online merchant terms on file in the system 100 associated with their transactions. Those online merchant terms were applicable at the date of their purchases, which are binding for that specific purchase. The users can do what they desire upon viewing the online merchant terms. For example, the users can look through those online merchant terms and attempt to get a refund or ship things back. They can attempt to get the merchant to abide by or be bound by the online merchant terms of that merchant that were applicable at that time of their purchase. They can also provide an authoritative source to the merchant to warrant what the users desire, for example, by pointing the merchant to the online merchant terms stored in the database 130. As such, this disclosure may provide a layer of protection for users when they deal with the merchants involved in the transactions.

In some embodiments, the online merchant terms stored in the database 130 may be needed to keep up-to-date. For example, to keep the online merchant terms stored in the database 130 up-to-date, a new version of the online merchant terms may be retrieved by the server 120 and is analyzed against the previous version on file in the database 130 to check for differences. If there are no differences, the recently retrieved online merchant terms are discarded. If there are differences, the version of the recently retrieved online merchant terms becomes the latest version of the online merchant terms and is stored in the database 130. The listed date range for the previous version may be adjusted accordingly. A new date range may be assigned to the latest version of the online merchant terms. This new date range has a start date on which the recently retrieved version is retrieved. The previous version may be discarded if there have no any transactions associated with it, which may reduce the need for storage space. However, the previous version may be retained if there have at least one transaction associated with it. If the previous version is retained, a new end date may be assigned to the date range previously listed for the previous version. This new end date of the previous version may be the date on which the recently retrieved version is retrieved. That is, this new end date of the previous version is the start date of the latest version, such that a new version of the online merchant terms (i.e., the latest version different than the previous version) is assigned a start date of the date on which the recently retrieved version is retrieved, and the previous version is assigned an end date of the date on which the recently retrieved version is retrieved.

Figure 6:
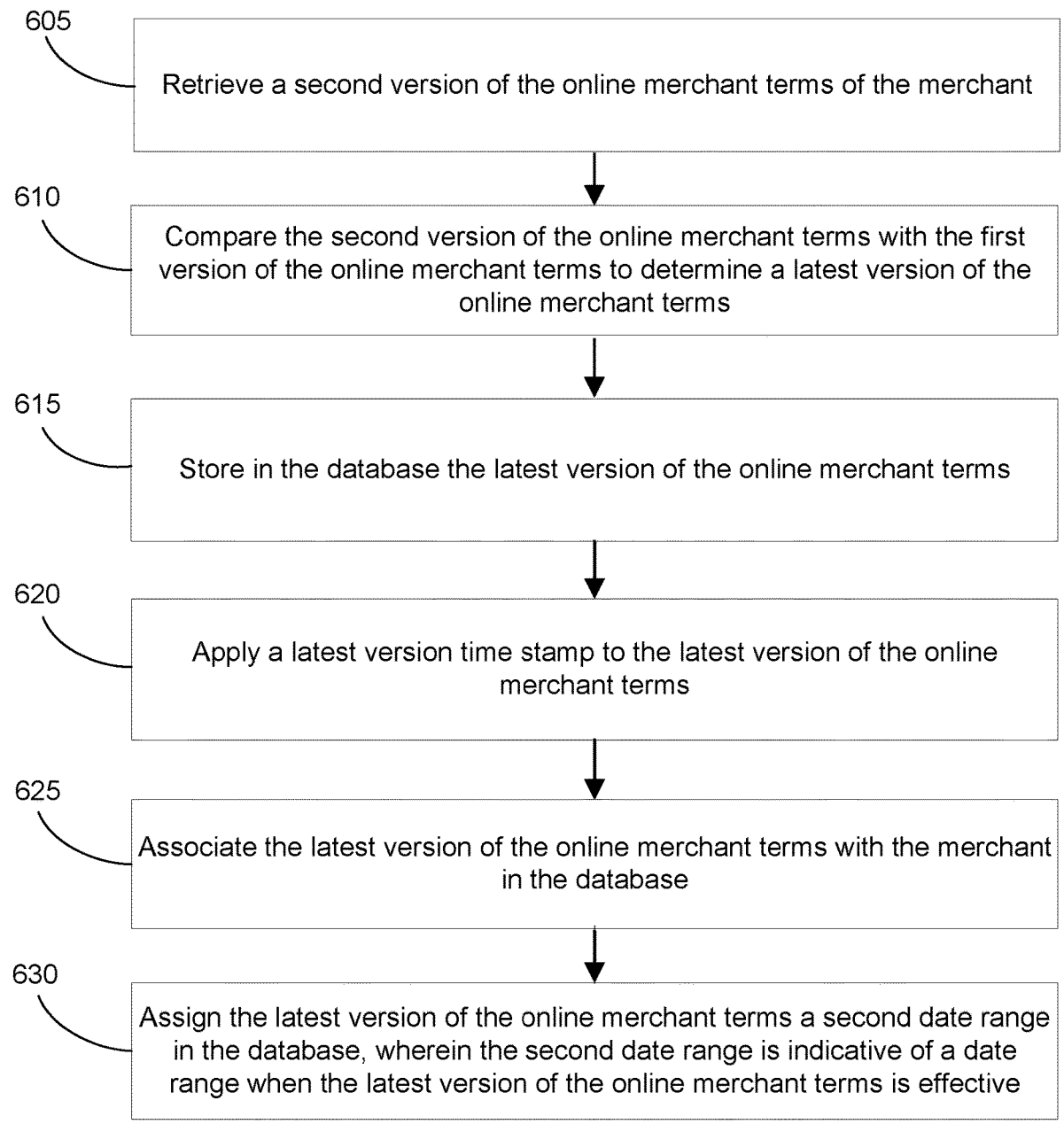
FIG. 6 is a flow chart illustrating a method of retrieving online merchant terms of a merchant and associating in a database the online merchant terms with the merchant according to an example embodiment.

FIG. 6 illustrates a method 600 of retrieving online merchant terms of a merchant and associating the online merchant terms with the merchant in a data store according to an example embodiment. The method 600 may be used to keep the online merchant term stored in the database 130 up-to-date. FIG. 6 may reference the same or similar components as those illustrated in FIGS. 1-5, including a user device, a server, a database, and a merchant device.

In step 605, the server 120 may retrieve a second version of the online merchant terms. As described in FIG. 2, the first version of the online merchant terms has been retrieved and stored in the database 130. To keep the online merchant terms up-to-date in the database 130, the server 120 may retrieve the second version of the online merchant terms. The retrieving techniques used for retrieving the second version can be the same as or similar to the retrieving techniques described for the first version in FIG. 2. For example, the retrieving of the second version can be based on a cached URL link that is used to retrieve the first version.

If the cached URL link is broken, then web crawling for the second version may be needed. Retrieving of the second version of the online merchant terms may occur based on a pre-configured triggering condition (e.g., at a pre-specified time interval, or when an event occurs to the merchant).

For example, the server 120 may retrieve a second version of the online merchant terms every day, every hour if more frequently is desired, every week or every month if less frequently is desired, even every year, or the like. The server 120 may also retrieve the second version of the online merchant terms based on merchant importance and/or transaction volume. For example, the server 120 may web crawl more frequently a popular merchant or a merchant involved in more transaction volume to see when their online merchant terms change, whereas the server 120 may web crawl less frequently a merchant involved in a small transaction volume to see if its online merchant terms change (e.g., every three years for a merchant having only two transactions in the past one year).

In some embodiments, retrieving of the second version of the online merchant terms may be triggered at a time when an event occurs, for example, changes in regulation/law relevant to the merchant, company acquisitions/merge/sale involving the merchant, email triggers, etc.

In some embodiments, retrieving of the second version of the online merchant terms may be triggered based on whether the first version of the online merchant terms has been verified during a pre-configured past time period, for example, the past 3 months. For example, in addition to the time stamp assigned to the first version in the database 130 where the time stamp indicates a retrieving date of the first version, the first version of the online merchant terms may also be assigned a latest verification date or the like. The latest verification date is a date during the pre-configured past time period when the first version is last checked whether the first version was still effective.

In step 610, the server 120 may compare the second version of the online merchant terms with the first version of the online merchant terms to determine a latest version of the online merchant terms. The comparison may be a textual comparison. In some examples, whitespace and the additional of new lines, punctuation, or other special characters can be ignored. The determined latest version may be the first version if no difference is identified between the first version and the second version, or may be the second version if at least a difference is identified. In some embodiments, checksums or hashes may be validated to determine if the first version and the second version are the same, which may be particularly applicable if the online merchant terms are shown in a file, instead of being on a webpage. Additional detail about determination of the latest version will be described with reference to FIG. 7.

In step 615, the server 120 may store in the database 130 the latest version of the online merchant terms. The latest version of online merchant terms may be further formatted and indexed in the database 130. The latest version of online merchant terms may be stored in the database 130 as various forms, which may include but not limited to, a text file (e.g., a plain text format), a structured data format (e.g., a XML document and/or a JSON document), and so forth. In addition, the latest version of online merchant terms may also be stored as a PDF file, an image file (e.g., a scanned image file and/or a picture file), an audio file, a video file, and/or an audio-video file in a file storage location such as a cloud storage offered by a cloud computing service provider. The database 130 may store links to the files stored in the file storage location.

In step 620, the server 130 may apply a latest version time stamp to the latest version of the online merchant terms, wherein the latest version time stamp is indicative of a retrieval time and a retrieval date at which the latest version of the online merchant terms is retrieved. In step 625, the server 120 may associate the latest version of the online merchant terms with the merchant in the database 130. In step 630, the server 120 may assign the latest version of the online merchant terms a second date range in the database, wherein the second date range is indicative of a date range when the latest version of the online merchant terms is effective in the database 130. Details of the above steps can be referred to the similar steps in FIG. 2 described for the first version of the online merchant terms.

Figure 7:
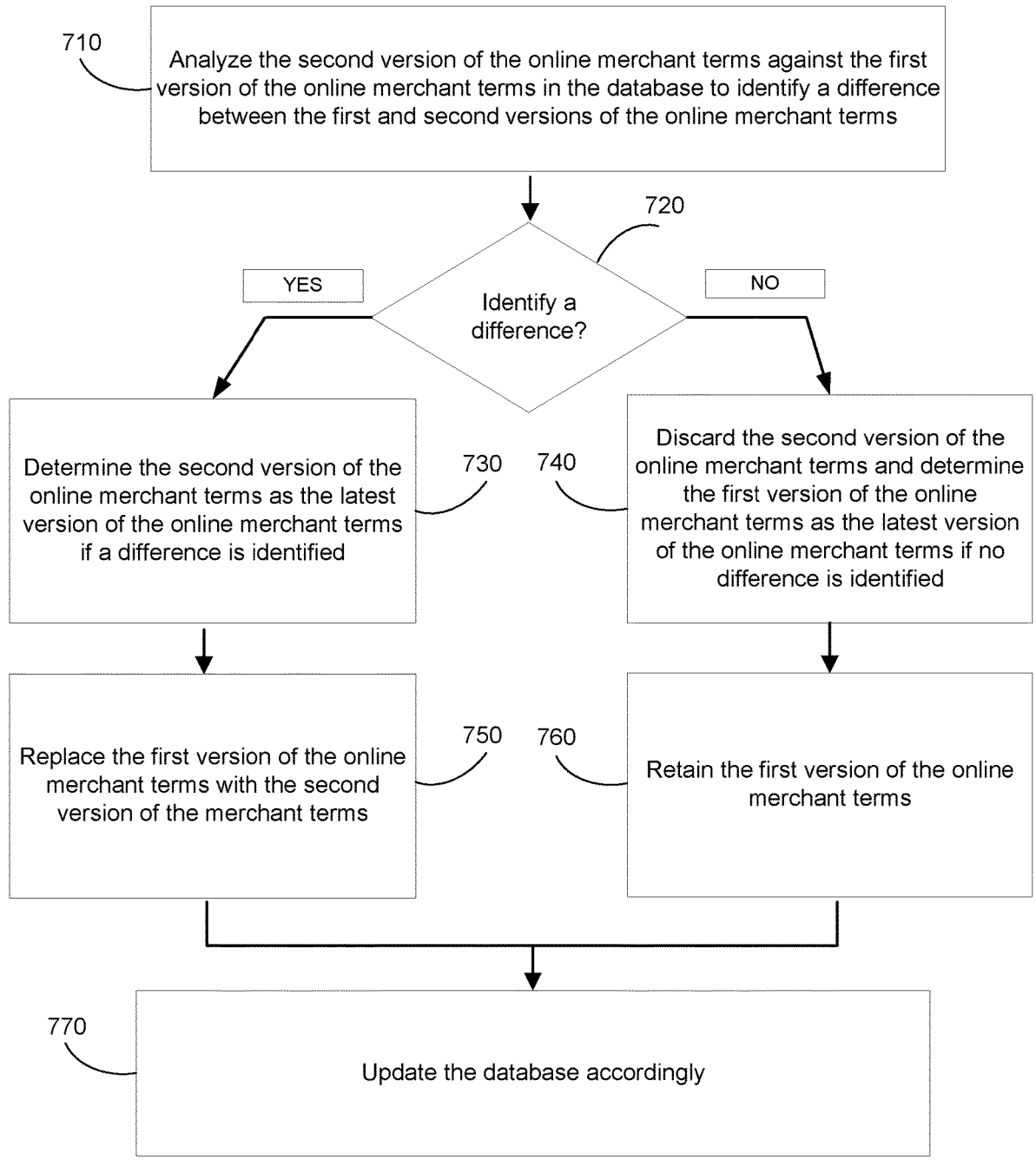
FIG. 7 is a flow chart illustrating a method of comparing a first version of online merchant terms of a merchant with a second version of the online merchant terms according to an example embodiment.

The step 610 in which the server 120 compares the second version of the online merchant terms with the first version of the online merchant terms to determine a latest version of the online merchant terms may be explained in detail in FIG. 7. FIG. 7 describes a method 700 of comparing the first version and the second version of the online merchant terms according to an example embodiment. FIG. 7 may reference the same or similar components as those illustrated in FIGS. 1-6, including a user device, a server, a database, and a merchant device.

In step 710, the server 120 may analyze the second version of the online merchant terms against the first version of the online merchant terms in the database to identify a difference between the first and second versions of the online merchant terms. For example, a textual comparison may be performed between the first version and the second version for the body text of the online merchant terms. The comparison analysis can include what is added to the second version, what is changed to the first version, and the like. There may be certain things that may not considered as a difference, for instance, space changes, additional new lines, added space and tab, punctuation, or other special characters, and the like.

In step 720, it is determined whether there have differences between the first version and the second version. If there have at least one difference (i.e., "YES" branch is selected), the method 700 proceeds to the step 730. If there have no differences (i.e., "NO" branch is selected), the method proceeds to the step 740.

In step 730, the server 120 determines the second version of the online merchant terms as the latest version of the online merchant terms. The first version may be discarded if there have not been any transactions associated with it, which may reduce the need for storage space. However, if there have transactions that are still associated with the first version, the first version of the online merchant terms may be retained in the database 130 and remains associated with the applicable transactions. Then the server 120 may assign a new date range as the second date range for the latest version. This new date range may be assigned a start date on which the second version is retrieved. The first version may be further assigned a cut-off date (i.e., a new end date of the first version) indicating that the first version is no longer valid because changes have been made to the first version. The cut-off date of the first version may be the retrieval date and time of the second version, or may be a date earlier than the retrieval date and time of the second version. In such scenario, there may have multiple versions of the online merchant terms of that merchant in the database 130.

If no applicable transactions are associated with the first version any more in the database 130, the first version of the online merchant terms may be removed from the database 130 and discarded. Then the server 120 may simply update the first date range of the first version to the second date range that is to be associated with the latest version of the online merchant terms. The first version of the online merchant terms may also be archived for reference in the future.

In some embodiments, the server 120 may notify the user of the differences or changes made to the online merchant terms based on a pre-configured condition of the user, wherein the pre-configured condition of the user may comprise an identification of a difference between the second version of the online merchant terms and the first version of the online merchant terms. The server 120 may also simply notify, for example, using text message, the user of a change having been made to the online merchant terms without further details on what the change is. The pre-configured condition of the user may also comprise a time period specified by the user. For example, the user may indicate that for any merchant that he or she has purchased things from in the last six months, he or she desires to be notified when the online merchant terms of that merchant change.

In step 740, the server 120 may discard the second version of the online merchant terms and determine the first version of the online merchant terms as the latest version of the online merchant terms because no difference is identified and the second version is just a repeat of the first version. However, the server 120 may assign a verification date to the first version. The verification date can indicate that the online merchant terms have been retrieved again and are still in effect without changes on the verification date.

In some embodiments, when the second version of the online merchant terms is determined as the latest version of the online merchant terms in step 730, the first version of the online merchant terms may be replaced with the second version of the merchant terms in step 750.

In some embodiments, when the second version of the online merchant terms is discarded and the first version of the online merchant terms is determined as the latest version of the online merchant terms in step 740, the first version of the online merchant terms is retained in step 760.

In step 770, the database 130 is updated accordingly. For example, the database 130 removes the first version of the online merchant terms when the second version of the online merchant terms is determined as the latest version of the online merchant terms, and no transactions were associated with the first version. For another example, when the second version of the online merchant terms is discarded and the first version of the online merchant terms is determined as the latest version of the online merchant terms, the database 130 may assign a new date range to the first version of the online merchant terms.

Figure 8:
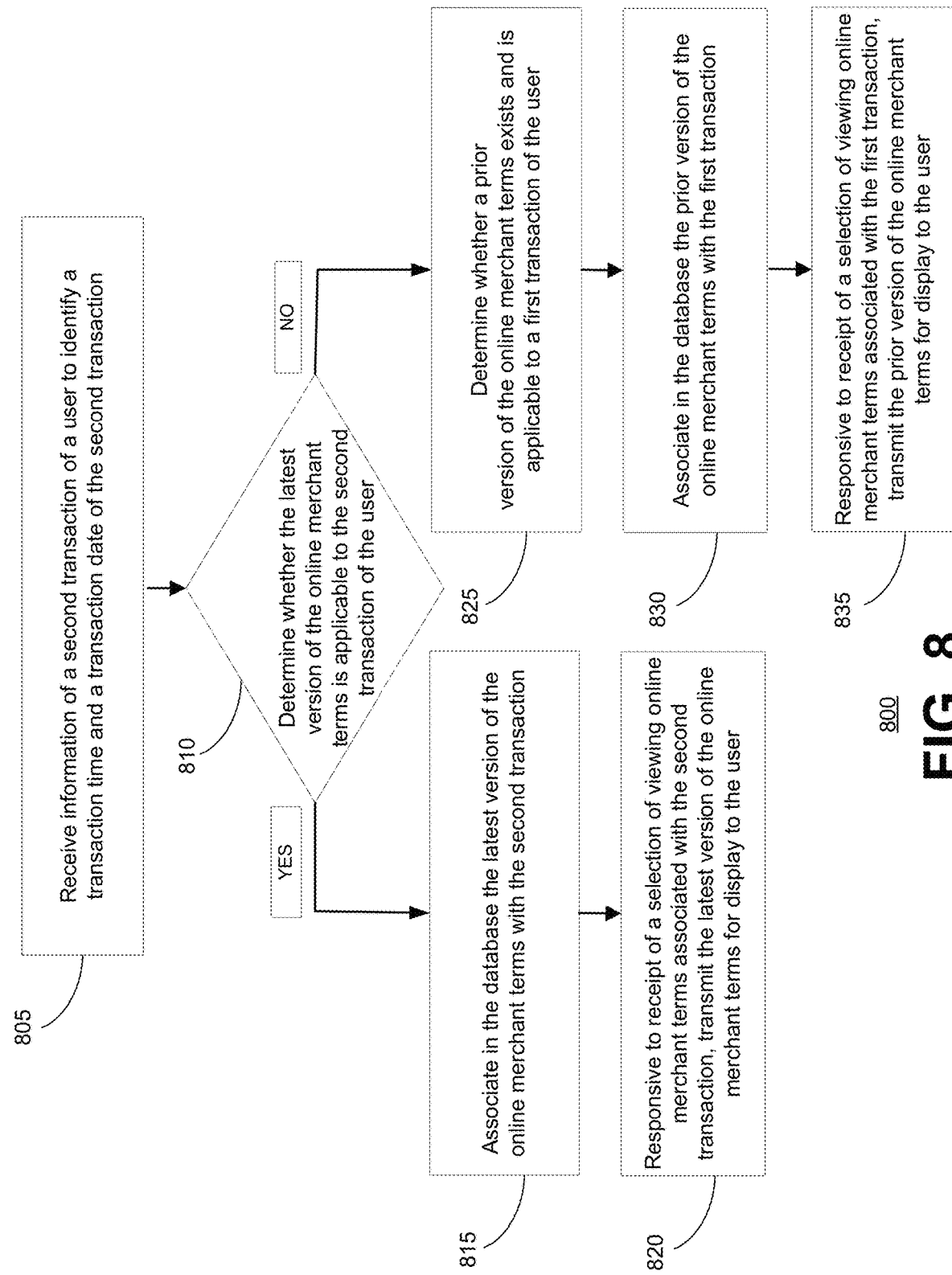
FIG. 8 is a diagram of associating online merchant terms of a merchant with transactions according to an example embodiment.

After the latest version of the online merchant terms is stored in the database 130, new transactions may be associated with the latest version of the online merchant terms. FIG. 8 describes a method 800 of associating the latest version of the online merchant terms with a new transaction (referred to as a second transaction) according to an example embodiment. FIG. 8 may reference the same or similar components as those illustrated in FIGS. 1-7, including a user device, a server, a database, and a merchant device.

In step 805, the server 120 may receive information of a second transaction of the user to identify a transaction time and a transaction date of the second transaction. The information of the second transaction may comprise the transaction time and the transaction date of the second transaction and a merchant identifier indicating the second transaction as be a transaction from the merchant. The transaction time and the transaction date of the second transaction are identified by extracting the transaction time and the transaction date of the second transaction from the information of the second transaction.

In step 810, the server 120 may determine whether the latest version of the online merchant terms is applicable to the second transaction of the user, based on the time stamp of the latest version of the online merchant terms, the second date range, and the transaction time and the transaction date of the second transaction. Details of this step may refer to the similar description of step 240 in FIG. 2.

If the "YES" branch is selected in step 810, the method 800 proceeds to step 815. In step 815, the server 120 may associate in the database 130 the latest version of the online merchant terms with the second transaction upon determining that the latest version of the online merchant terms is applicable to the second transaction. In step 820, responsive to receipt of a selection of viewing online merchant terms associated with the second transaction, the server 120 may transmit the latest version of the online merchant terms for display to the user. Details of the above steps may refer to the similar description of steps 245 and 250 in FIG. 2.

If the "NO" branch is selected in step 810, the method may proceed to step 825. In some embodiments, some prior transactions may be flagged as not having been associated with any online merchant terms, or may be associated with incorrect online merchant terms (e.g., the association could be due to the wrong effective dates of online merchant terms, online merchant terms from the wrong merchant, etc.). In such scenario, in step 825, the server 120 may determine whether a prior version of the online merchant terms exists and whether the prior version of the online merchant terms is applicable to a prior transaction or a different transaction (e.g., the first transaction of the user), based on the time stamp of the latest version of the online merchant terms, the second date range, and the transaction time and the transaction date of the first transaction. Details of this step may refer to the similar description of step 240 in FIG. 2.

In step 830, the prior version of the online merchant terms may be associated in the database 130 with the first transaction upon determining that the latest version of the online merchant terms is not applicable to the first transaction. In step 835, responsive to receipt of a selection of viewing online merchant terms associated with the first transaction, the server 120 may transmit the first version of the online merchant terms for display to the user. Details of the above steps may refer to the similar description of steps 245 and 250 in FIG. 2.

Figure 9:
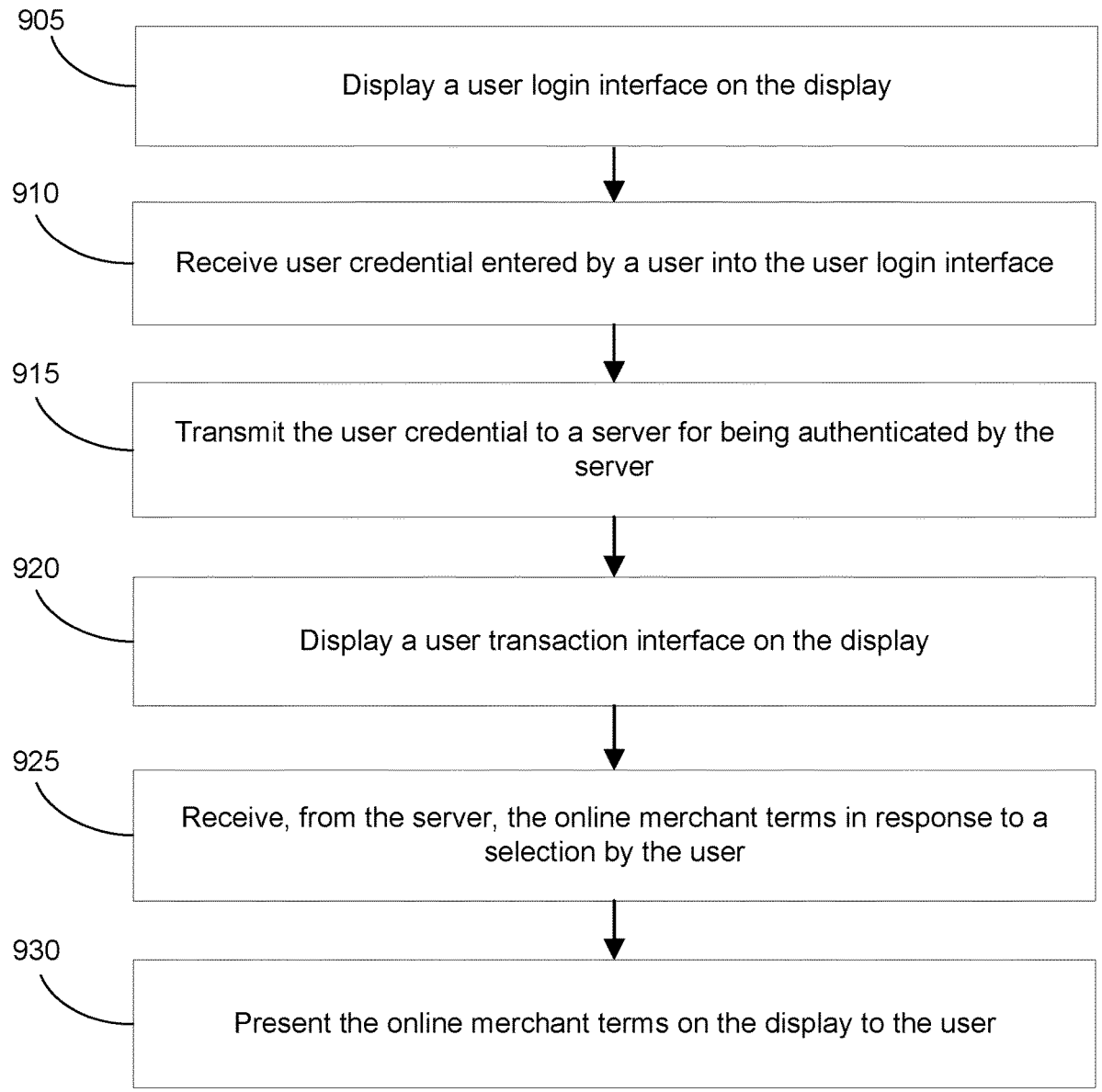
FIG. 9 is a flow chart illustrating a method of presenting to a user online merchant terms of a merchant associated with a transaction of the user according to an example embodiment.

As described above, a user may use the user device 110 to check their transaction history and to view the online merchant terms associated with the transaction. FIG. 9 describes a method 900 of viewing online merchant terms on the user device 110 according to an example embodiment. FIG. 9 may reference the same or similar components as those illustrated in FIGS. 1-8, including a user device, a server, a database, and a merchant device.

In step 905, the user device 110 may display a user login interface on the display 114 of the user device 110. The login interface may be presented in a web browser of the application 113. The login interface may comprise an interface for logging into the server 120.

In step 910, the user device 110 receives user credential entered by the user into the user login interface. When the user determines to check their transaction history and to view the online merchant terms associated with the transactions, the user can enter his login credential, such as user name and password, on the login interface. For example, the user may want to find out whether he or she can return his purchase and get a refund according to the online merchant terms stored in the database 130.

In step 915, the user device 110 may transmit the user credential to the server 120 for being authenticated by the server 120. After receiving the user login credential, the device 110 transmit the user login credential to the server 120 for authentication. Such communications between the device 110 and the server 120 may be performed through the secure back channel of the network 150 as described in FIG. 1 above. Such communications may also be encrypted for further security.

In step 920, the user device 110 may display a user transaction interface on the display 114. The user interface may comprise at least one transaction associated with the user and a merchant, and one or more options regarding accessing online merchant terms. Exemplary user transaction interfaces may include the diagram shown in FIG. 4 and the diagram shown in FIG. 5.

In step 925, the user device 110 may receive, from the server, the online merchant terms in response to a selection by the user of an option from the one or more options. The selected option can be an option of reviewing the online merchant terms. For example, the user may click on a URL link in FIG. 4 or a "view terms" button in FIG. 5. Upon such selection, the server 120 may transmit the online merchant terms associated with the transaction to the device 110, as described in step 250 in FIG. 2.

In step 930, the user device 110 presents the online merchant terms on the display 114 to the user. Upon receiving the online merchant terms from the server 120, the user device 110 display the online merchant terms to the user, such as in block 515 in FIG. 5.

In some embodiments, a user transaction may be declined to further protect the user if online merchant terms are not applicable or unavailable in the database 130 to that transaction. For example, the user may attempt to buy something expensive (e.g., over a certain price threshold) or of a certain type or category of product or service (e.g., a smartphone or another electronic device), and no online merchant terms are applicable or available in the database 130 to that transaction, that transaction may be declined. The server 120 may further send the user a message indicating that no online merchant terms are applicable or available on file at this moment and the server 120 is proactively looking them up. The sever 120 may then send the user another message once the online merchant terms are retrieved and stored in the database 130, such that the user can try the declined transaction again.

The certain type or category of product or service may be a type or category of product or service that presents a high risk to the user's life or health. An exemplary service of such category may be aerial sports such as parasailing. The certain type or category of product or service may be a type or category of product or service that exhibits a high value. An exemplary product of such category may be high end jewelries such as diamond or gold. The certain type or category of product or service may be a type or category of product or service that bears a potential high risk to the user's financial condition. An exemplary service of such category may be an advertised low fee and high return investment service or product.

Alternatively, the user may be provided an option of whether he or she wants to proceed with the transaction and/or whether he or she can provide the online merchant terms that are applicable to that transaction (e.g., the user may provide a URL link to the online merchant terms or a copy of the online merchant terms). Alternatively, if the merchant involved in the transaction has never been recognized by the server 120, the transaction may be initially declined while the server 120 attempts to go collect the online merchant terms and/or send the user a message of what is happening.

Alternatively, when online merchant terms are not applicable or unavailable in the database 130 to a transaction, the server 120 may determine whether to approve the transaction or decline it based on a transaction price threshold. For example, if the transaction was over $50, it may be declined. Whereas if the transaction was less than $50, the transaction may be approved.

In some embodiments, a transaction may be a recurring transaction, for example, rental fees for apartment rental, subscription to software service, and the like. The server 120 may monitor the online merchant terms to see whether or not they have been changed. In this respect, the server 120 may cross-reference the terms with the merchant of the recurring transaction with the merchant's terms at the last time that the recurring charge was incurred, and if the server 120 registers that the merchant has changed their terms, the server 120 can proactively alert the user of the change of the terms. The alert can be sent to the user either at the time that a change of the terms is identified or at the time proximate to expect the user to be charged again. For example, if the user gets charged the $8^{th}$ of every month, then the alert can be sent to the user on the $6^{th}$ of every month, notifying the user that this merchant has changed their online merchant terms. Therefore, the user can be provided with an opportunity for making a change to the recurring transaction, such as cancelling the service, changing to another type of service, and the like, prior to incurring an additional charge.

In some embodiments, a natural language processing (NLP) model may be used to process online merchant terms, for example, to identify an effective date of the online merchant terms. For example, a transaction may have occurred before the first version of the online merchant term of that merchant was retrieved and stored in the database 130. In such scenario, the server 120 may use the NLP model to identify when the online merchant terms went into place. For example, the NLP may be used to search for things like "Effective Date 1/1/1999" or "Document Last Updated Feb. 1, 2010" in the online merchant terms. If the online merchant terms are identified to be in effect earlier than the transaction date and the transaction time of the transaction, the online merchant terms can be retroactively applicable to the transaction and can be associated with the transaction in the database 130, even though the online merchant terms are retrieved and stored in the database 130 later than the transaction. Therefore, there may be in the database 130 multiple versions of the online merchant terms of a merchant, which may be chronologically organized and put in place for retroactive transactions.

Throughout the disclosure, the terms and policies of a merchant are referred to as online merchant terms throughout this disclosure. However, it is understood that the present disclosure is not limited to online merchants and instead includes online merchants selling products or services online (e.g., via a website), merchants having one or more physical locations, and merchants having a combination of selling products online and in physical locations. Accordingly, it is understood that online merchant terms are not limited to terms and policies of merchants selling products or services only online or only to the terms and policies applicable to products or services sold online.

Throughout the disclosure, the term merchant is used, and it is understood that the present disclosure is not limited to a particular merchant or type of merchant. Rather, the present disclosure includes any type of merchant, vendor, or other entity involving in activities where products or services are sold or otherwise provided.

In some examples, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of the user device 110, the server 120 and/or the merchant device 140 or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

Throughout the disclosure, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method, comprising:
applying, by a server, a time stamp to a first version of online merchant terms, wherein the time stamp is indicative of a retrieval time and a retrieval date associated with the first version of the online merchant terms;
associating, by the server, the first version of the online merchant terms with the merchant in a database;
applying an intelligent trigger to web-scrape the Internet for a second version of online merchant terms at a relevant time, the relevant time defined by one of a change in regulation or law and a merchant acquisition;
receiving, by the server, information of a first transaction of a user to identify a transaction time and a transaction date of the first transaction, the information of the first transaction comprising a merchant identifier indicating the first transaction as being a transaction from the merchant;
searching, by the server, based on the information of the first transaction, the database for the first version of the online merchant terms;
determining, by the server, whether the first version of the online merchant terms is applicable to the first transaction, based on the time stamp of the first version of the online merchant terms, and the transaction time and the transaction date of the first transaction; and
associating, by the server in the database, the first version of the online merchant terms with the first transaction upon determining that the first version of the online merchant terms is applicable to the first transaction;
wherein in order to associate the first version of the online merchant terms with the first transaction, the processor is further configured to:
generate an interactive user interface including at least one button indicative of reviewing online merchant terms;
associate the at least one button with the first version of the online merchant terms through an API; and
associate the interface with the first transaction.

2. The method of claim 1, further comprising:
assigning, by the server, the first version of the online merchant terms a first date range in the database, wherein the first date range is indicative of a date range when the first version of the online merchant terms is effective; and
determining, by the server, whether the first version of the online merchant terms is applicable to the first transaction, further based on the first date range.

3. The method of claim 1, wherein the transaction time and the transaction date of the first transaction are identified by the server by extracting the transaction time and the transaction date of the first transaction from the information of the first transaction.

4. The method of claim 1, further comprising, responsive to receipt of a selection of viewing online merchant terms associated with the first transaction, transmitting, by the server, the first version of the online merchant terms for display to the user.

5. The method of claim 1, further comprising:
retrieving, by the server, the first version of the online merchant terms by accessing a uniform resource locator (URL); and
caching, by the server, the URL.

6. The method of claim 1, further comprising:
retrieving, by the server after a time interval, a second version of the online merchant terms;
comparing, by the server, the second version of the online merchant terms with the first version of the online merchant terms to determine a latest version of the online merchant terms;
storing, by the server in the database, the latest version of the online merchant terms;
applying, by the server a latest version time stamp to the latest version of the online merchant terms;
associating, by the server, the latest version of the online merchant terms with the merchant in the database; and
assigning, by the server, the latest version of the online merchant terms a second date range in the database, wherein the second date range is indicative of a date range when the latest version of the online merchant terms is effective.

7. The method of claim 6, wherein the latest version time stamp is indicative of a retrieval time and a retrieval date at which the latest version of the online merchant terms is retrieved.

8. The method of claim 6, wherein the time interval is based on a specified time interval.

9. The method of claim 6, wherein the retrieving of the second version of the online merchant terms is triggered based on an event occurring for a merchant associated with the online merchant terms.

10. The method of claim 9, wherein the event comprises at least one selected from the group of a law change and a regulation change.

11. The method of claim 6, wherein the retrieving of the second version of the online merchant terms is triggered based on a transaction volume for a merchant associated with the online merchant terms.

12. A system, comprising:
a database; and
a server in data communication with the database,
wherein the server:
applies a time stamp to a first version of online merchant terms, wherein the time stamp is indicative of a retrieval time and a retrieval date associated with the first version of the online merchant terms,
associates the first version of the online merchant terms with the merchant in the database,
applies an intelligent trigger to web-scrape the Internet for a second version of online merchant terms at a relevant time, the relevant time defined by one of a change in regulation or law and a merchant acquisition;

receives information of a first transaction of a user to identify a transaction time and a transaction date of the first transaction, the information of the first transaction comprising a merchant identifier indicating the first transaction as being a transaction from the merchant, searches, based on the information of the first transaction, the database for the first version of the online merchant terms, determines whether the first version of the online merchant terms is applicable to the first transaction, based on the time stamp of the first version of the online merchant terms, and the transaction time and the transaction date of the first transaction; and associates, in the database, the first version of the online merchant terms with the first transaction upon determining that the first version of the online merchant terms is applicable to the first transaction;

wherein in order to associate the first version of the online merchant terms with the first transaction, the processor is further configured to:

generate an interactive user interface including at least one button indicative of reviewing online merchant terms;

associate the at least one button with the first version of the online merchant terms through an API; and associate the interface with the first transaction.

13. The system of claim 12, wherein the server:

retrieves, after a time interval, a second version of the online merchant terms, compares the second version of the online merchant terms with the first version of the online merchant terms to determine a latest version of the online merchant terms, stores, in the database, the latest version of the online merchant terms, applies a latest version time stamp to the latest version of the online merchant terms, associates the latest version of the online merchant terms with the merchant in the database, and assigns the latest version of the online merchant terms a second date range in the database.

14. The server of claim 13, wherein the second date range is indicative of a date range when the latest version of the online merchant terms is effective.

15. The server of claim 13, wherein retrieving of the second version of the online merchant terms is triggered based on an event occurring for a merchant associated with the online merchant terms.

16. The server of claim 15, wherein the event comprises at least one selected from the group of a company acquisition, a company merge, and a company sale.

17. The server of claim 13, wherein the retrieving of the second version of the online merchant terms is triggered based on whether the first version of the online merchant terms has been verified during a pre-configured past time period.

* * * * *